(12) United States Patent
Cipullo et al.

(10) Patent No.: US 11,506,561 B2
(45) Date of Patent: Nov. 22, 2022

(54) OVERHEAT DETECTION SYSTEMS FOR AIRCRAFT

(71) Applicants: Airbus Operations, S.L.U., Getafe (ES); Airbus Operations SAS, Toulouse (FR); Airbus Operations LTD, Filton Bristol (GB)

(72) Inventors: Alessio Cipullo, Filton Bristol (GB); Sy-Dat Le, Toulouse (FR); Carlos Bueno Vazquez, Getafe (ES)

(73) Assignees: AIRBUS OPERATIONS S.L.U., Getafe (ES); AIRBUS OPERATIONS SAS, Toulouse (FR); AIRBUS OPERATIONS LTD, Filton Bristol (GB)

(*) Notice: Subject to any disclaimer, the term of this patent is extended or adjusted under 35 U.S.C. 154(b) by 411 days.

(21) Appl. No.: 16/711,886

(22) Filed: Dec. 12, 2019

(65) Prior Publication Data
US 2020/0191680 A1 Jun. 18, 2020

(30) Foreign Application Priority Data
Dec. 14, 2018 (EP) .................................. 18382927

(51) Int. Cl.
*G01M 3/04* (2006.01)
*G01K 11/3206* (2021.01)
(Continued)

(52) U.S. Cl.
CPC ............. *G01M 3/047* (2013.01); *B64D 45/00* (2013.01); *G01K 11/32* (2013.01);
(Continued)

(58) Field of Classification Search
CPC ........ G01M 3/047; G01M 3/002; G01M 3/38; B64D 45/00; B64D 2045/009; G01K 11/32; G01K 11/3206; G01K 13/024
See application file for complete search history.

(56) References Cited

U.S. PATENT DOCUMENTS 6,881,948 B2 * 4/2005 Dammann ............. B64D 45/00
374/161
10,112,726 B2 * 10/2018 Wilson ............... G01K 11/3206
(Continued)

FOREIGN PATENT DOCUMENTS

| EP | 3246683 A1 | 11/2017 |
|---|---|---|
| WO | 02016979 A2 | 2/2002 |
| WO | 2018134617 A1 | 7/2018 |

OTHER PUBLICATIONS

European Search Report; priority document.

*Primary Examiner* — Nathaniel T Woodward
*Assistant Examiner* — Philip L Cotey
(74) *Attorney, Agent, or Firm* — Greer, Burns & Crain, Ltd.

(57) ABSTRACT

An overheat detection system for an aircraft, the system comprising a first bleed monitoring computer, BMC1, configured to identify leakages in a pneumatic system, the BMC1 including a first optical controller, a second bleed monitoring computer, BMC2, the BMC2 including a second optical controller, an optical fiber link connecting the first optical controller of the BMC1 and the second optical controller of the BMC2 for communication between the BMC1 and the BCM2 and between the first optical controller and the second optical controller, wherein the first and the second optical controllers are configured to detect overheat of the optical fiber link based on a wavelength shift of a modulated optical signal transmitted through the optical (Continued)

fiber link, and transmit signals to the first BMC1 and the second BMC2 based at least on the detected overheat.

8 Claims, 4 Drawing Sheets

(51) Int. Cl.
  *B64D 45/00* (2006.01)
  *G01K 11/32* (2021.01)
  *G01K 13/024* (2021.01)
  *G01M 3/00* (2006.01)
  *G01M 3/38* (2006.01)

(52) U.S. Cl.
  CPC ........ *G01K 11/3206* (2013.01); *G01K 13/024* (2021.01); *G01M 3/002* (2013.01); *G01M 3/38* (2013.01); *B64D 2045/009* (2013.01)

(56) References Cited

U.S. PATENT DOCUMENTS

| | | | | |
|---|---|---|---|---|
| 10,144,507 | B2* | 12/2018 | Chretien | H02K 21/14 |
| 10,436,652 | B2* | 10/2019 | Wilson | G01L 1/242 |
| 2002/0125414 | A1* | 9/2002 | Dammann | B64D 45/00 |
| | | | | 250/227.14 |
| 2005/0089081 | A1* | 4/2005 | Dammann | B64D 45/00 |
| | | | | 374/161 |
| 2007/0051166 | A1* | 3/2007 | Baker | G01M 3/188 |
| | | | | 73/40.5 R |
| 2008/0090510 | A1* | 4/2008 | Scherer | B64D 37/32 |
| | | | | 454/71 |
| 2017/0274992 | A1* | 9/2017 | Chretien | H02K 16/00 |
| 2017/0334574 | A1* | 11/2017 | Wilson | G08C 23/04 |
| 2017/0334575 | A1* | 11/2017 | Wilson | G01K 11/32 |
| 2017/0336268 | A1* | 11/2017 | Wilson | G01K 11/32 |
| 2017/0336269 | A1* | 11/2017 | Wilson | G01K 11/3206 |
| 2019/0277709 | A1* | 9/2019 | Miller | G01K 11/3206 |
| 2019/0353552 | A1* | 11/2019 | Doyle | G01M 11/085 |

\* cited by examiner

OVERHEAT DETECTION SYSTEMS FOR AIRCRAFT

CROSS-REFERENCES TO RELATED APPLICATIONS

This application claims the benefit of the European patent application No. 18382927.4 filed on Dec. 14, 2018, the entire disclosures of which are incorporated herein by way of reference.

FIELD OF THE INVENTION

The present invention relates to an overheat detection system (OHDS) for identification of leakages in a pneumatic system of an aircraft and the use of fiber optics for data transmission.

BACKGROUND OF THE INVENTION

Pneumatic systems are also known as vacuum or pressure systems. These type of systems can power many functions within the aircraft, e.g., they can power landing gears, flaps, windows, air conditioning, doors and auto pilot devices. Pneumatic systems use compressible fluids like air or pure gas to transmit power.

Alternatively, hydraulic systems utilize relatively-incompressible liquids like mineral oil, ethylene glycol, water, synthetic type liquids, or high temperature fire-resistant fluids to make power transmission possible. Unlike compressible fluids, a half-liter of an incompressible fluid as, e.g., water, still occupies the same space regardless of how hard it is compressed. Hence, hydraulic systems may consume more space of the aircraft compared to pneumatic systems. Furthermore, pneumatic systems do not utilize reservoirs, hand pumps, accumulators, regulators, or engine-driven or electrically driven power pumps for building normal pressure, in contrast to hydraulic systems.

In contrast, the pneumatic system in aircraft comprises air compressors, pneumatic ducts to conduct the air, relief valves, control valves, check valves, restrictors, filters, etc. As control units, the pneumatic system can be controlled and monitored by Bleed Monitoring Computers (BMC). Each BMC can be in communication with an Overheat Detection System Unit (OHDU) for control of high temperature bleed air leaks on pneumatic ducts of the pneumatic system. A first BMC can be connected to a second BMC through avionics data buses as, e.g., ARINC 429 buses. When hot air is leaking out of the ducts of the pneumatic system, the hot air is detected by the OHDUs and an alert is sent to the BMCs of the pneumatic system through communication buses as, e.g., Controller Area Network (CAN) buses. Then, the BMCs perform actions needed to isolate the bleed air leak that may include at least communication with another BMC through the avionics data buses and informing the cockpit of the aircraft.

Currently, there are two known technologies that can be implemented as OHDS:

Eutectic salt sensing elements: A small AC electrical current is transmitted from one end to another end of an OHDS wire. The wire has eutectic salt separating the core of the wire from the external layer, which is connected to ground. In case there is a leak, this eutectic salt, which has a very high impedance, would become a conductor with a very low impedance. As a consequence, the core of the wire is connected to the eternal layer, leading to a short circuit, detected by the pneumatic controller.

An OHDS system based on fiber optics: An optical controller of a first OHDU sends a light signal to a fiber optics loop, the fiber optics loop is connected on both ends to optical controllers within the OHDUs. The fiber optic loop comprises FBGs (Fiber Bragg Gratings) which reflects specific wavelengths of the light spectrum. Depending on the temperature change of the FBG, the reflection of the signal would have a different wavelength shift. As a consequence, the optical controllers identify the wavelength shift of the reflected signal caused by overheat. Furthermore, overheat is notified to the pneumatic controller which can identify the overheat as a leak in the pneumatic ducts.

In this regard, FIG. 1 shows an example of a conventional architecture (100) for BMCs of a pneumatic system of an aircraft using optical OHDUs. The part of the architecture (100) for the BMCs is shown by reference (110) and the part of the architecture (100) for the OHDUs is shown by reference (120). The BMCs and the OHDUs are independent elements within the architecture (100) connected by different data buses. The BMCs comprise a first unit "BMC1" (112) and a second unit "BMC2" (114) that communicate via avionics data buses as, e.g., ARINC 429 data buses. The OHDUs comprise a first OHDU (122) "OHDU fwd" and a second OHDU (124) "OHDU aft." The OHDUs (122, 124) can communicate via communication buses as, e.g., CAN buses that connect each of the optical controllers of the OHDUs (122, 124). An optical fiber link (130) used for overheat detection connects the optical controllers of the first OHDU (122) "OHDU fwd" and the second OHDU (124) "OHDU aft" establishing a fiber optic loop. This optical link (130) can be used for overheat detection based on FBGs. Furthermore, the "OHDU fwd" and the "OHDU aft" are in communication with the BMCs via the CAN buses as shown in FIG. 1. The pneumatic system (100) can be involved with several systems within the aircraft as, e.g., the Data Acquisition Concentrators (SDAC), Air Conditioning System Controller (Acsc), Flight Data Recorder (FDR), Centralized Fault Display System (CFDS), etc.

Hence, current implementations of OHDS systems based on fiber optics involve the use of communication buses to connect the optical controllers of the ODHUs and also to connect the OHDUs with the pneumatic system controllers BMCs. The BMCs are connected via avionics data buses that permit communication of BMCs for performing several actions, in particular for performing actions related to isolate a leak identification in the pneumatic system and inform the cockpit of the aircraft. Hence, an implementation of OHDS system based on fiber optics that improves communication between OHDUs and BCMs and between BMCs, and that at the same time simplifies the current bus architecture to reduce cost and complexity is desired.

SUMMARY OF THE INVENTION

Current OHDS implementations with fiber optics uses the fiber for temperature measurement purposes only be means of FBGs. Thus, a binary response that indicates overheat of the fiber optics can be obtained, and therefore a leakage in the pneumatic ducts can be identified by the BMCs. Fiber optics can also be used as a very powerful data transmitter channel for high data transmissions rates. If an optic fiber loop is established between the BMCs connecting the optical controllers of the OHDUs integrated within the BMCs, the fiber optic loop could also be used for communication purposes between both BMCs and both OHDUs. This would lead to a very high data rate transmission system and to a simplification of the current architecture by getting rid of the data buses for communication between the BMCs and the optical controllers in the fiber optic loop and between the optical controllers and the BMCs.

Hence, the proposed solution decreases the number of interfaces between optical and pneumatic controllers, which involves a reduction of weight, installation time and system testing. In particular, two physical interfaces can be removed, i.e., communication buses, e.g., CAN and avionics data buses, e.g., ARINC 429 buses, as well as associated plugs, attachments, testing elements, etc. In addition, the number of OHDS loops would lead to a high redundancy of the communication increasing robustness of the optical communication system. Other advantages can be reduction of Final Assembly Line (FAL) installation time and implementation of Ground Tests Requirements (GTR) to check the communications.

Hence, in one aspect of the present invention, it is proposed an overheat detection system. The system can detect overheat in a pneumatic duct. Overheat is identified by a BMC as a leakage of the pneumatic duct. Pneumatic ducts are part of a pneumatic system of the aircraft. The system comprises a first bleed monitoring computer "BMC1" configured to identify leakages upon reception of a overheat alert. The "BMC1" includes a first optical controller performing OHDU functions for detection of overheat in an optic fiber link. The communication between the "BMC1" and the first optical controller of OHDU is performed through internal buses.

The system also comprises a second bleed monitoring computer "BMC2" configured to identify leakages, the "BMC2" including a second optical controller performing OHDU functions. The communication between the "BMC1" and the first optical controller is performed through internal buses.

The system also comprises an optical fiber link that connects the first and the second optical controllers in such a way that a fiber-optic loop is established between the first and the second optical controller.

The system also comprises a fiber-optic loop connecting the first optical controller of the "BMC1" and the second optical controller of the "BMC2" for communication between the "BMC1" and the "BCM2," and between the first optical controller and the second optical controller. The first and the second optical controllers are configured to detect overheat of air leakage with the fiber-optic loop based on a wavelength shift of an optical signal transmitted through the fiber-optic loop. The detection of overheat of the fiber-optic loop permits identification of a leakage by the first "BMC1" and the second "BMC2" based on an overheat alert.

The fiber-optic loop can be implemented as a data transmission system. Each of the optical controllers comprises three major elements, i.e., a transmitter (light source), a termination of optical fiber link and a receiver. Hence, high data transmission rates over fiber optic can be achieved. For each optical controller, the transmitter of light source generates an optical signal which is a light stream modulated either in phase or in amplitude to enable it to carry the data for communication between BMCs and optical controllers.

The modulation can be performed according to a direct modulation scheme or external modulation scheme. In the direct modulation scheme, the driving current applied to a directly modulated semiconductor laser as, e.g., a tunable laser is varied according to the data to be transmitted, i.e. the modulating signal. In the external modulation scheme, the laser is subjected to a constant bias current and emits a continuous optical wave, and an optical modulator external to the laser is used, wherein the external modulator switches the optical power on or off to a pulse optical signal according to the data stream. Conventionally a pulse of light indicates a "1" and the absence of light indicates "0."

In order to detect overheat of air leakage with the fiber-optic loop based on a wavelength shift of the optical signal, a FBG can be printed onto the optical fiber link. Hence, a wavelength shift of the optical spectrum of the optical signal reflected on the FBG of the optical fiber link can be detected. The modulated optical signal is transmitted down through the optical fiber link to be received at the optical controller in the fiber-optic loop. At the receiver side, an optoelectronic device converts the received pulses of light of the modulated signal into analogue current and an analogue to digital converter convert this current into an equivalent digital stream to be processed by a Digital Signal Processor (DSP). Analog amplifiers to amplify the analogue signal can also be used. In some examples, optical filters to select and/or cancel components of the optical spectrum of the optical signal can be used as well as optical multiplexers, splitters, etc.

In another aspect of the present invention, it is proposed a method for detecting overheat in an aircraft. The method can detect overheat in a pneumatic duct. Overheat is identified as a leakage of the pneumatic duct of the pneumatic system of the aircraft. The method is performed by the overheat detection system previously described in the present disclosure.

The method comprises the first and/or the second optical controllers detecting overheat of the fiber-optic loop based on a wavelength shift of a modulated optical signal transmitted through the optical fiber link of the fiber-optic loop.

Upon communication between the first and the second optical controllers connected via the fiber-optic link, the first and the second optical controllers are configured to provide an overheat alert based on an overheat detection. Furthermore, the optical controllers are configured to inform the "BMC1" and the "BMC2". The BMCs can receive the overheat alert via internal bus communication with their respective optical controllers.

Upon communication between the "BMC1" and the "BMC2" via the fiber-optic loop, the "BMC1" and the "BMC2" are configured to identify a leakage in a pneumatic duct of the pneumatic system based on the overheat alert. As previously mentioned, the overheat alert is identified by the BMCs as a leakage of a pneumatic duct of the pneumatic system.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION OF THE PREFERRED EMBODIMENTS

Figure 1:
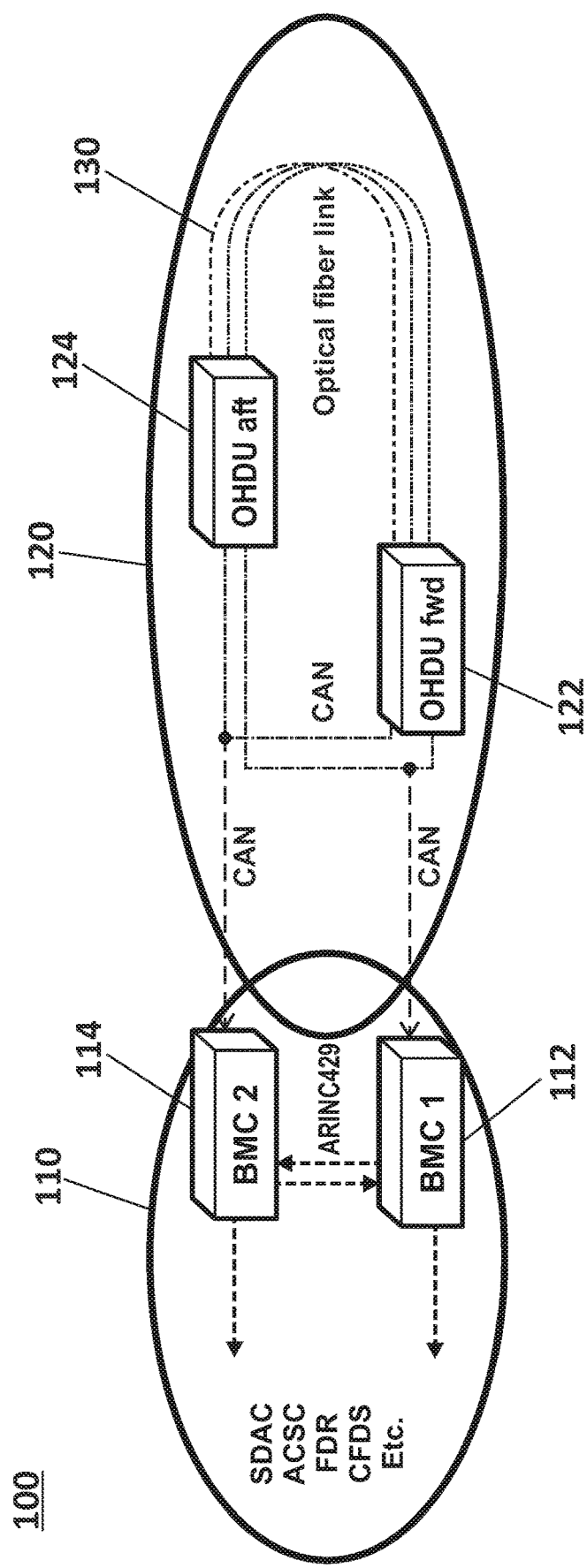
FIG. 1 shows an example of a conventional architecture for optical OHDUs and BMCs.
Figure 2:
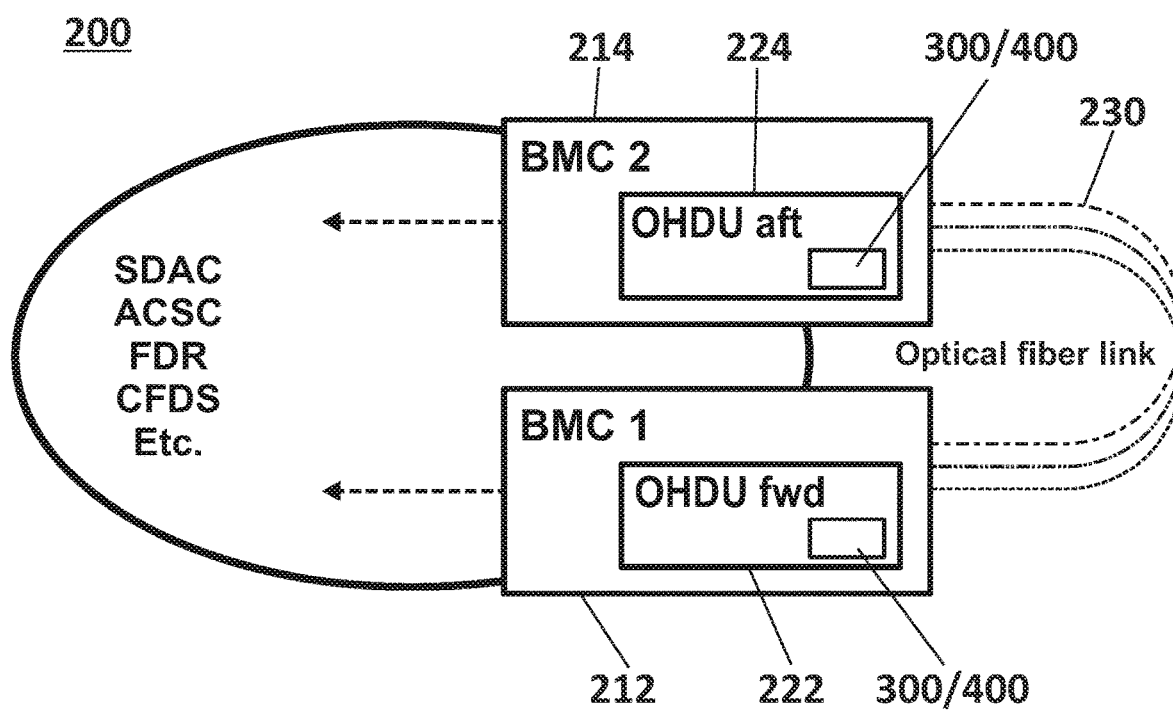
FIG. 2 shows a proposed architecture for data transmission between OHDUs and BMCs according to the present disclosure.

FIG. 2 shows a proposed architecture (200) for data transmission between BMCs using fiber optics and overheat detection with OHDUs according to the present disclosure. According to the proposed architecture (200) the optical controller (300, 400) of the first OHDU (222) "OHDU fwd" is integrated into the first unit "BMC1" (212), and the optical controller (300, 400) of the second OHDU (224) "OHDU aft" is integrated into the second unit "BCM2" (214). Hence, the communication between the OHDUs (222, 224) and the BMCs (212, 214) is performed via internal buses within the BMCs instead of external communication buses as, e.g., CAN buses in contrast to the architecture (100) shown in FIG. 1. In an alternative implementation, the optical controllers (300, 400) are external to the BMCs (212, 214) so the BMCs (212, 214) can communicate with the optical controllers (300, 400) via communication buses.

The optical controller of the first OHDU (222) "OHDU fwd" and the optical controller (300, 400) of the second OHDU (224) "OHDU aft" together with the optical fiber link (230) establish a fiber optic loop. The optical controllers (300, 400) of the first and second OHDUs (222, 224) comprise optical modulation capabilities to obtain a modulated optical signal that transmit data through the optical fiber link (230). The BMCs (212, 214) can also communicate via the fiber optic loop. Hence avionics data buses as, e.g., ARINC 429 buses are no longer required in contrast to the architecture (100) shown in FIG. 1. The OHDUs (222, 224) can also communicate through the fiber optical link (230). Hence, communication buses as, e.g., CAN buses are no longer required. The pneumatic system (200) can be involved with several systems within the aircraft as, e.g., the Data Acquisition Concentrators (SDAC), Air Conditioning System Controller (ACSC), Flight Data Recorder (FDR), Centralized Fault Display System (CFDS), etc.

Figure 3:
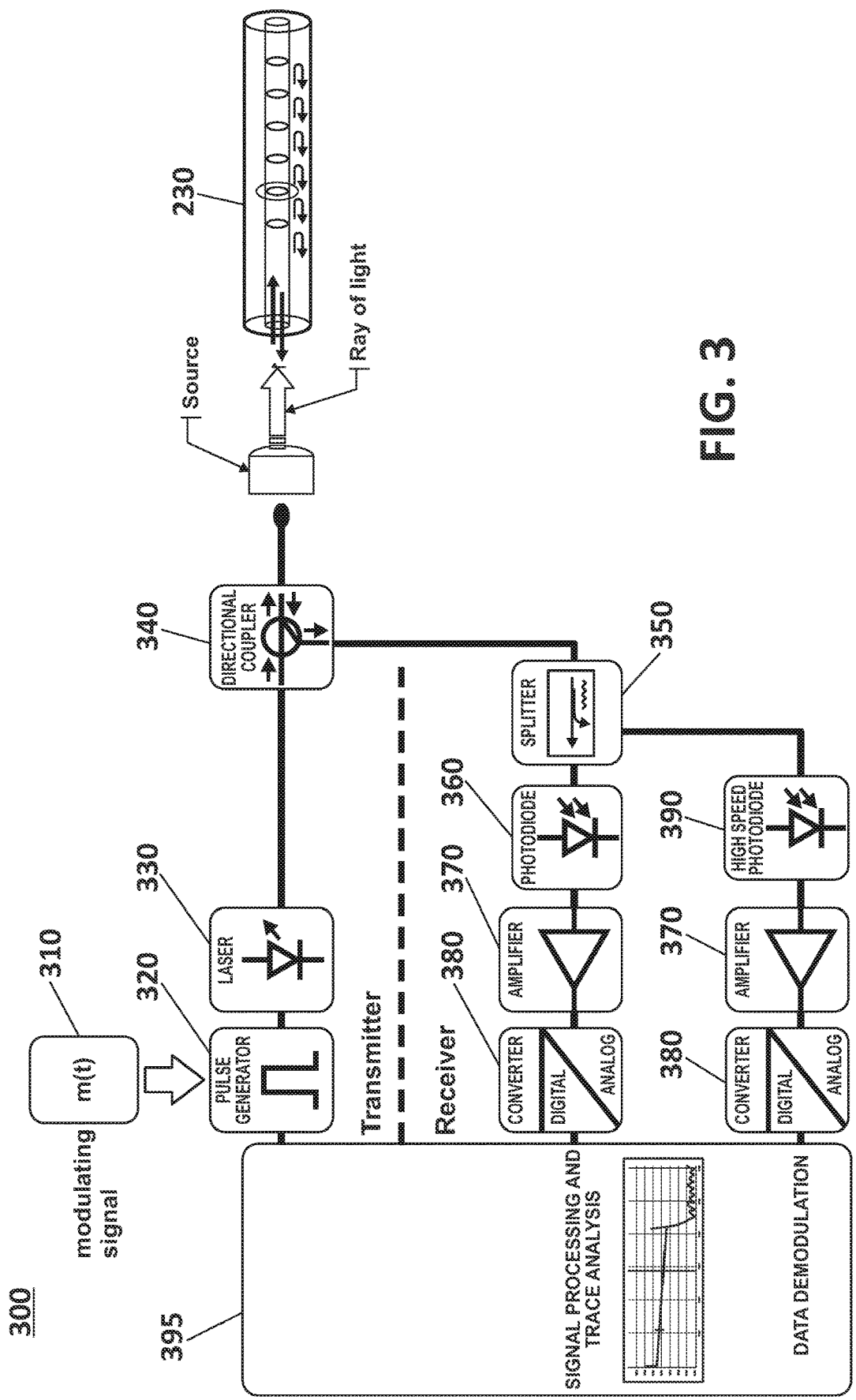
FIG. 3 shows first example of an optical controller of an OHDU according to the present disclosure.

FIG. 3 shows a first example of an optical controller (300) of an OHDU having optical modulation capabilities for data transmission according to the present disclosure.

At the transmitter side of the optical controller (300) of the OHDU, the optical controller (300) has modulation capabilities for modulating a large band optical spectrum of a broadband source. In FIG. 3, the optical controller (300) uses a direct modulation (DM) laser (330). A pulse generator (320) provides a driving current modulated with a modulating signal m(t) (310) to the DM laser (330), as, e.g., a tunable laser as optical source. The modulating signal m(t) (310) is the data to be transmitted between the OHDUs (222, 224) and the BMCs (212, 214). Hence, the DM laser (330) receives a modulating driving current to provide a modulated broadband optical signal to be transmitted. A directional coupler (340) permits transmitting the modulated optical signal into the fiber link (230). In some examples, external optical modulation can also be used to provide the modulated optical signal to be transmitted through the optical fiber link (230). In some examples, if a desired bit-rate for the data transmission between optical controllers is less than 1 Gb/s and the distance between optical controllers is 10 meters or less, a direct modulation may be suitable.

At the receiver side of the optical controller (300) of the OHDU, the optical controller (300) comprises an optical splitter (350) to split the received modulated broadband optical signal. Furthermore, the controller (300) comprises optoelectronic devices as, e.g., a photodiode (360) and a high speed photodiode (390) that converts the split optical signals into electrical signals (electric current) and analogue amplifiers (370) to amplify the electrical signals. Furthermore, the optical controller (300) comprises A/D converters (380) to convert the electric currents into equivalent digital streams that are demodulated and processed by a Digital Signal Processor (DSP) (395) to obtain the modulating signal m(t) comprising the data to be transmitted between the OHDUs (222, 224) and the BMCs (212, 214) at the receiver side of the optical controller (300).

Figure 4:
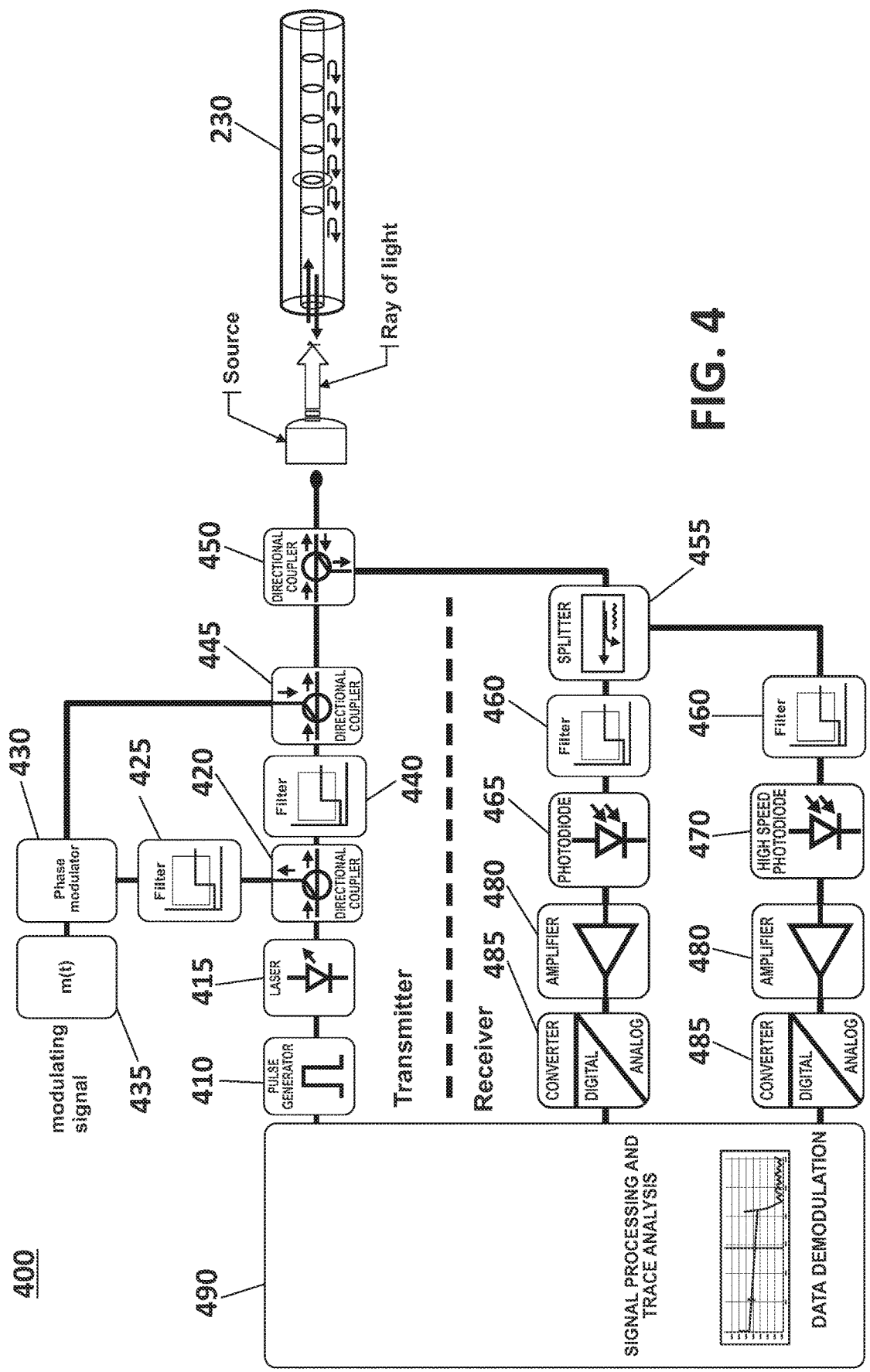
FIG. 4 shows a second example of an optical controller of an OHDU according to the present disclosure.

FIG. 4 shows a second example of an optical controller (400) of an OHDU with optical modulation capabilities for data transmission using external optical modulation according to the present disclosure.

At the transmitter side, the optical controller (400) of the OHDU comprises a pulse generator (410) emitting a constant current that drives a continuous wave (CW) laser (415) that emits a continuous wave optical signal. The CW laser (415) can provide a CW optical signal having a large band optical spectrum. A directional fiber optic coupler (420) is used to provide two outputs of the optical signal. An optical splitter comprising an optical filter (425) is configured to filter a part of the optical spectrum of the continuous wave optical signal having a broadband spectrum. The filtered spectrum can be at any wavelength on a broadband spectrum.

The filtered optical spectrum can be modulated by an external modulator (430) as, e.g., an external phase modulator. Other types of external modulator could be used. The phase modulator on-off switches the filtered optical signal based on the modulating signal m(t) (435) that comprises the data to be transmitted between the OHDUs (222, 224) and the BMCs (212, 214). Hence, the external modulator (430) receives the CW optical signal from the CW laser (415) after being filtered by the optical filter (425) that selects a part of the optical spectrum for modulation and provides a modulated broadband optical signal. The original signal is also filtered with an optical filter (440) to provide a filtered version of the optical spectrum which is merged with the modulated broadband optical signal using another directional coupler (445). This merged optical signal is sent into the fiber optical link (230) via the directional coupler (450).

At the receiver side, the optical controller (400) comprises a splitter (455) and an optical filter (460) to split the received broadband optical signal previously merged at the transmitter side. The two split optical signals are converted into current signals by optoelectronic devices as, e.g., a photodiode (465) and high speed photodiode (470). The current signals are amplified by analogue amplifiers (480) and converted into equivalent digital streams that are demodulated and processed by a Digital Signal Processor (DSP) (490) to obtain the modulating signal m(t) that carries the data to be transmitted between the OHDUs (222, 224) and the BMCs (212, 214) at the receiver side of the optical controller (400).

Even though reference has been made to a specific embodiment of the invention, it is obvious for a person skilled in the art that the system described herein is susceptible to numerous variations and modifications, and that all the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An overheat detection system for an aircraft, the system comprising:
    a first bleed monitoring computer, BMC1, configured to identify leakages in a pneumatic system, the BMC1 including a first optical controller;
    a second bleed monitoring computer, BMC2, configured to identify leakages in the pneumatic system, the BMC2 including a second optical controller;
    an optical fiber link connecting the first optical controller of the BMC1 and the second optical controller of the BMC2 for communication between the BMC1 and the BCM2, and between the first optical controller and the second optical controller,
    wherein the first and the second optical controllers are configured to:
    detect overheat of the optical fiber link based on a wavelength shift of a modulated optical signal transmitted through the optical fiber link, and
    transmit overheat signals to the first BMC1 and the second BMC2 based at least on the detected overheat, and
    wherein the first BMC1 and the second BMC2 are configured to identify a leakage based on the overheat signals,
    wherein the first optical controller and the second optical controller each comprise a receiver side and a transmitter side wherein the receiver side comprises a splitter to split a received modulated broadband optical signal.

2. The overheat detection system for an aircraft according to claim 1, wherein the optical fiber link comprises Fiber Bragg Gratings.

3. The overheat detection system for an aircraft according to claim 1, wherein the first and the second controllers comprise at least one of amplitude or phase modulation capabilities to obtain the modulated optical signal transmitted through the optical fiber link.

4. The overheat detection system for an aircraft according to claim 1, wherein the first and the second optical controllers comprise a tunable laser.

5. The overheat detection system for an aircraft according to claim 1, wherein the first and the second optical controllers comprise a continuous wave laser and an optical modulator external to the continuous wave laser.

6. The overheat detection system for an aircraft according to claim 1, wherein the signals transmitted to the first BMC1 and the second BMC2 indicate an overheat detection alert.

7. A method for detecting overheat in an aircraft performed by the overheat detection system of claim 1
    the method comprising:
    detecting, by at least one of the first or the second optical controllers, overheat of the optical fiber link based on a wavelength shift of a modulated optical signal transmitted through the optical fiber link;
    transmitting signals by the first and the second optical controllers, upon communication between the first and the second optical controllers through the optical fiber link, comprising at least an overheat alert to the BMC1 and the BMC2 based on the detected overheat; and
    identifying a leakage by the BMC1 and the BMC2 based on the overheat alert upon communication between the BMC1 and the BMC2 through the optical fiber link.

8. The method according to claim 7, further comprising:
    upon communication between the BMC1 and the BMC2 through the optical fiber link, the BMC1 and the BMC2 informing a cockpit of the aircraft about the leakage.

* * * * *